United States Patent
Usami et al.

(10) Patent No.: US 6,481,742 B2
(45) Date of Patent: Nov. 19, 2002

(54) CASE OF AIR BAG SYSTEM

(75) Inventors: Hironori Usami, Nishikasugai-gun (JP); Kazumi Ichimaru, Nishikasugai-gun (JP); Rie Ichino, Nishikasugai-gun (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/729,956

(22) Filed: Dec. 6, 2000

(65) Prior Publication Data

US 2001/0002749 A1 Jun. 7, 2001

(30) Foreign Application Priority Data

Dec. 6, 1999 (JP) ............................................. 11-346238
Dec. 7, 1999 (JP) ............................................. 11-347769

(51) Int. Cl.$^7$ ........................... B60R 21/20; B60R 21/16
(52) U.S. Cl. ..................... 280/728.2; 280/732; 280/736
(58) Field of Search ............................. 280/728.2, 732, 280/741, 736

(56) References Cited

U.S. PATENT DOCUMENTS

| | | | | |
|---|---|---|---|---|
| 5,342,084 A | * | 8/1994 | Rose et al. .................. | 280/732 |
| 5,456,489 A | * | 10/1995 | Rose et al. ............... | 280/728.2 |
| 5,462,305 A | * | 10/1995 | Hamada ..................... | 280/728.2 |
| 5,487,556 A | * | 1/1996 | Jenkins et al. ............ | 280/728.2 |
| 5,553,886 A | * | 9/1996 | Gunn et al. ............... | 280/728.2 |
| 5,577,764 A | * | 11/1996 | Webber et al. ............ | 280/728.2 |
| 5,836,607 A | * | 11/1998 | Wallner .................... | 280/728.2 |
| 5,887,891 A | * | 3/1999 | Taquchi et al. .......... | 280/728.2 |
| 6,126,191 A | * | 10/2000 | Pepperine et al. ....... | 280/728.2 |
| 6,247,721 B1 | * | 6/2001 | Lang ........................ | 280/728.2 |

FOREIGN PATENT DOCUMENTS

| | | | |
|---|---|---|---|
| EP | 0 771 697 A2 | * | 5/1997 |
| JP | 08310326 | * | 11/1996 |
| JP | 410006905 A | * | 1/1998 |
| JP | 10-100829 | * | 4/1998 |
| JP | 10129384 A | * | 5/1998 |
| JP | 2000-272456 A | * | 10/2000 |
| WO | WO 00/35720 | * | 6/2000 |

* cited by examiner

Primary Examiner—Paul N. Dickson
Assistant Examiner—Ruth Ilan
(74) Attorney, Agent, or Firm—Pillsbury Winthrop LLP

(57) ABSTRACT

An air bag system has an air bag, an inflator for inflating the air bag, the inflator having a first end and a second end with a flange portion, a casing for receiving the air bag and the inflator, the casing including an air bag receiving casing and an inflator receiving casing, and a cover portion for covering an opening portion of the casing. A pair of fitting holes are formed in two wall surfaces of the inflator receiving casing opposite to each other and the fitting holes are substantially equal in diameter to each other so that the inflator can be fitted into the fitting holes. The first end of the inflator is engaged with a first fitting hole through a spacer while the second end of the inflator is connected to a second fitting hole through the flange portion, and a position regulating member is provided in one of the casing and the spacer for preventing the inflator from shifting in position.

2 Claims, 15 Drawing Sheets

CASE OF AIR BAG SYSTEM

BACKGROUND OF THE INVENTION

1. Field of Invention

The present invention relates to a structure for preventing gas leakage during inflator's operation in an air bag system in which an inflatable air bag for use in a car is inflated by gas generated from an inflator so as to protect a crew.

The present application is based on Japanese Patent Applications No. Hei. 11-346238 and 11-347769, which are incorporated herein by reference.

2. Description of the Related Art

Generally, an air bag system has such a configuration that an inflatable air bag and an inflator for generating gas for inflating the air bag are received in a casing, and an air bag side opening portion of the casing is closed by a cover portion which has a hinge portion and a rupture presumptive portion.

Sheet metal is used for casings in most air bag systems. In some air bag systems, however, in order to take measures for environmental problems such as regulations of exhaust gas of, for example, carbon dioxide or the like, and in order to reduce the weight of a car as a whole, casing material has been changed from sheet metal to resin material. Then, the aforementioned inflator is received in an inflator receiving casing. The inflator is fixedly fastened in a predetermined position inside the casing by a bolt projected from a forward end portion of the inflator, and a nut to be screwed down to the bolt. As a structure for attaching such an inflator, there has been a proposal as shown in FIG. 18.

In this structure, fitting holes 16d and 16e in which an inflator 31 can be inserted from its front side or its rear side are provided in opposite, front and rear side walls of an inflator receiving casing 16b.

Then, a lock flange portion 31a formed in the base end portion of the inflator 31 is locked at the outer circumferential edge of one fitting hole 16d while a bolt 33 formed in the forward end portion of the inflator 31 is attached to the other fitting hole 16e through a spacer 32. That is, a fitting flange portion 32a of the spacer 32 is engaged with the fitting hole 16e, and the bolt 33 of the inflator 31 is made to project outside through a bolt insertion hole 32b of the spacer 32. A nut 34 is screwed down to the bolt 33 so as to fixedly fasten the inflator 31 in a predetermined position.

In the aforementioned structure for attaching the inflator 31, however, when there occurs a car collision such that the inflator 31 operates to inflate the air bag 21 with gas, the reaction of the gas causes high-pressure gas to pass into a bottom portion of the inflator receiving casing 16b. As a result, the inflator 31 receives force so as to be pushed up. That is, because the inflator receiving casing 16b is formed of synthetic resin material and the spacer 32 is made of metal material, the inflator receiving casing 16b is lower in rigidity than the spacer 32. Accordingly, there occurs a phenomenon that the fitting flange portion 32a slides up while elastically deforming the circumferential edge of the fitting hole 16e. As a result, the fitting flange portion 32a of the spacer 32 is detached from the fitting hole 16e of the casing 16 as shown by the chain line in FIG. 9. Thus, there is a fear that gas leaks from a gap-between the inflator receiving casing 16b and the spacer 32 so that the inflation of the air bag 21 becomes imperfect.

On the other hand, the casing 16 made of resin material has a weld portion which is peculiar to a resin molding. That is, the weld portion is formed by branches of a resin solution which pass in a plurality of directions in a cavity so as to be brought into contact with and bonded with each other when the casing 16 is molded. Therefore, also in an air bag system in which no spacer 32 is used in an inflator receiving casing 16b with fitting holes 16d and 16e having different diameters, there is a problem that the weld portion may be broken to cause gas leakage when the inflator 31 is operated.

Further, a case of another air bag system is shown in FIG. 19.

That is, the air bag system case has a cover 101 formed integrally with an instrument panel body (hereinafter referred to as "instrument panel" simply) 100, a housing 110 fitted to the cover 101, and so on. A door portion. 101c is formed in the cover 101. The door portion 101c is defined by a rupture presumptive portion 101b and a hinge portion 101a. An air bag 120 folded up and an inflator 121 for unfolding the air bag 120 are received in a space formed by the cover 101 and the housing 110. The air bag 120 is unfolded by gas generated by the inflator 121 in response to a signal from a sensor attached to a vehicle body or the like. By the unfolding of the air bag 120, the door portion 101c is opened and the unfolded air bag 120 is released to protect a crew.

In this configuration, a through hole 102 is provided in a side wall 101d of the cover 101, while a lock portion 111 is provided like a bridge on a side wall 110a of the housing 110 so as to be located in a position corresponding to the through hole 102. Then, the housing 110 is fitted to the cover 101, and the lock portion 111 of the housing 110 is engaged with the through hole 102 of the cover 101. Thus, the cover 101 and the housing 110 are locked with each other. Further, a plate 130 having an insertion portion 130a which can be partially inserted into the lock portion 111 of the housing 110 is used to hold the side wall 101d of the cover 101 between the plate 130 and the side wall 110a of the housing 110. Then, the plate 130 is fixed on the housing 110 by studs 131 and nuts 132.

When the air bag system is configured thus the movement of the cover 101 to leave the housing 110 is restricted because the insertion portion 130a of the plate 130 is inserted into the air bag system. Thus, there is no fear that the cover 101 is unexpectedly released from the locking between the through hole 102 of the cover 101 and the lock portion 111 of the housing 110.

However, there is a problem that the lock portion 111 of the housing 110 is disengaged from the through hole 102 of the cover 101 when the air bag 120 is unfolded.

That is, when the air bag 120 is unfolded suddenly, force in the direction shown by the arrows A1 in FIG. 19 acts on the side wall 101d of the cover 101. Thus, the side wall 101d of the cover 101 bulges apart from the side wall 110a of the housing 110, so that there arises a fear that the plate 130 is deformed as shown by the dotted lines in FIG. 19. When the plate 130 is deformed conspicuously like this, the restriction of the insertion portion 130a of the plate 130 on the movement of the side wall 101d of the cover 101 becomes so insufficient that there is a fear that the through hole 102 of the cover 101 is apart from the lock portion 111 of the housing 110. As a result, there is a fear that the gas generated by the inflator 121 leaks to the outside of the air bag system. In addition, there is a fear that such gas leakage results in an unfolded state of the air bag 120 different from an aimed state.

SUMMARY OF THE INVENTION

It is an object of the present invention to provide a structure for preventing gas leakage during inflator's operation in an air bag system that can solve a new problem of gas leakage during inflator's operation which is common to the aforementioned background art.

In order to achieve the above object, according to the present invention, there is provided a structure for preventing gas leakage during inflator's operation in an air bag system comprising: an inflatable air bag for use in a car; an inflator for generating gas for inflating the airbag, the inflator having a flange portion and a bolt provided at a base end portion thereof and at a forward end portion thereof, respectively; a casing for receiving the air bag and the inflator; and a cover portion for covering an opening portion of the casing on the air bag side; wherein the casing is integrally constituted by an air bag receiving casing and an inflator receiving casing each of which is made of synthetic resin material; wherein a pair of fitting holes are formed in front and rear wall surfaces of the inflator receiving casing opposite to each other, so that the fitting holes are substantially equal in diameter to each other and so that the inflator can be fitted into the fitting holes; wherein one end portion of the inflator is engaged with one of the opposite fitting holes while the other end portion of the inflator is connected to the other fitting hole through a spacer; and wherein position regulating means is provided in the casing or the spacer for preventing the inflator from shifting in position.

The flange portion provided at one end portion of the inflator is preferably locked by a lock flange portion which is formed at an outer edge portion of the fitting hole, while a fitting flange portion formed in the spacer is fitted into the other fitting hole; and the bolt of the inflator is inserted into a bolt insertion hole provided in a center portion of the spacer, while a nut is screwed down to the bolt so as to fixedly fasten the inflator to the inflator receiving casing together with the spacer.

The position regulating means preferably includes the position regulating ribs integrally formed with an outer surface of the air bag receiving casing correspondingly to an outer circumferential edge of the spacer.

The position regulating means preferably includes a position regulating rib formed on an outer circumferential edge of the spacer so as to be bent to cover an outer circumferential surface of the inflator receiving casing.

The position regulating means preferably includes a position regulating rib integrally formed with an inner surface of a boundary portion between the air bag receiving casing and the inflator receiving casing so as to project from the inner surface and impose positional regulation on an outer circumferential surface of the inflator.

The position regulating rib is preferably used also as an attachment shelf plate which is formed integrally for connecting the air bag with an inner circumferential edge of a bottom portion of the air bag receiving casing.

The position regulating means preferably includes a position regulating rib formed so as to also have a function as a reinforcing rib provided correspondingly with a weld portion formed by branches of a resin solution which pass in a plurality of directions in a cavity so as to be brought into contact with and bonded with each other when the casing is molded with resin.

Further, there is provided a structure for preventing gas leakage during inflator's operation in an air bag system comprising: an inflatable air bag for use in a car; an inflator for generating gas for inflating the air bag, the inflator having a flange portion and a bolt provided at a base end portion thereof and at a forward end portion thereof, respectively; a casing for receiving the air bag and the inflator; and a cover portion for covering an opening portion of the casing on the air bag side; wherein the casing is integrally constituted by an air bag receiving casing and an inflator receiving casing; and wherein a reinforcing rib is formed integrally with the casing correspondingly with a weld portion formed by branches of a resin solution which pass in a plurality of directions in a cavity so as to be brought into contact with and bonded with each other when the casing is molded with resin.

It is another object of the present invention to provide a case of an air bag system in which disengagement between a cover portion and a housing can be restricted even when an air bag is unfolded.

In order to achieve the above object, according to the invention, there is provided a case of an air bag system, comprising: a cover provided on a body of an interior part; a housing having a lock portion which can engage with an engagement portion of the cover; a lock holding member for holding a lock state between the housing and the cover; and deformation restriction means for restricting deformation of the lock holding member.

The deformation of the lock holding member is preferably restricted by the deformation restriction means so that the lock between the engagement portion of the cover and the lock portion of the housing is held even when an air bag is unfolded.

Preferably, the engagement portion of the cover is a through hole which is provided in a side wall of the cover; the lock portion of the housing is a bridge portion which is provided on a side wall of the housing to project therefrom; the lock holding member has a lock holding portion which can be partially inserted into the bridge portion; and the bridge portion is inserted into the through hole, while the lock holding portion is inserted into the bridge portion, and the cover is held between the lock holding member and the housing.

The deformation of the lock holding portion of the lock holding member can be restricted by the deformation restriction means even if the side wall of the cover bulges when the air bag is unfolded.

The deformation restriction means is preferably provided in the lock portion of the housing.

The deformation restriction means preferably constitutes part of the cover.

The size of the case of the airbag system can be restricted so as not to increase.

Preferably, the lock holding member is a plate.

Disengagement between the engagement portion of the cover and the lock portion of the housing can be restricted without making any large change in the lock holding member.

Preferably, an engagement protrusion portion is provided on a forward end portion of the plate.

Disengagement between the engagement portion of the cover and the lock portion of the housing can be restricted more effectively by the engagement between the engagement protrusion portion of the plate and the lock portion of the housing.

Features and advantages of the invention will be evident from the following detailed description of the preferred embodiments described in conjunction with the attached drawings.

DETAILED DESCRIPTION OF THE PREFERRED EMBODIMENTS

An embodiment of an air bag system for use in an instrument panel according to the present invention will be described below with reference to FIGS. 1 to 5 and 9.

Figure 2:
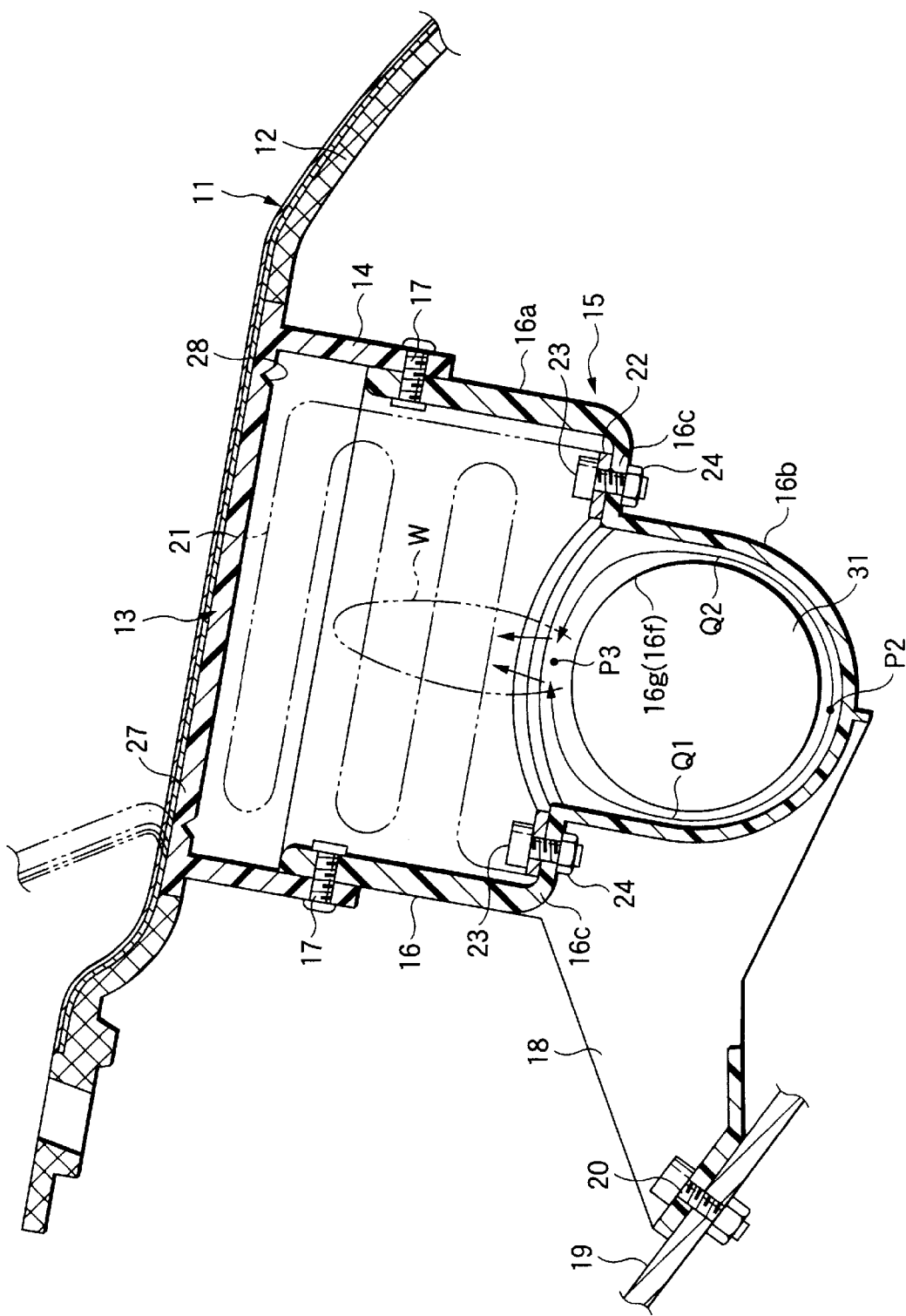
FIG. 2 is a cross-sectional view of the air bag system.
Figure 4:
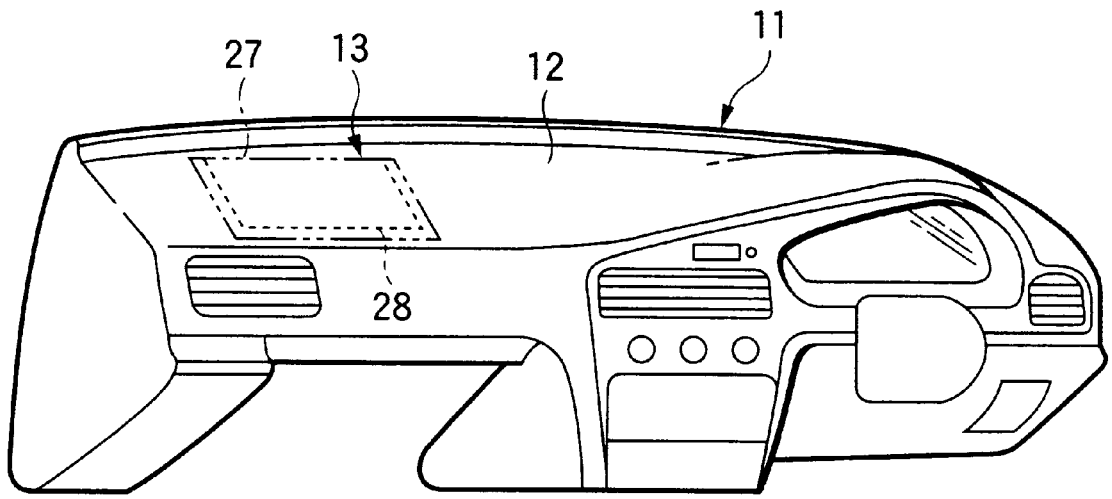
FIG. 4 shows a perspective view of the instrument panel.

As shown in FIG. 4, an instrument panel 11 used as an automotive interior part is constituted by a body portion 12, a cover portion 13 provided in a left upper portion of the body portion 12, and an attachment wall 14 formed integrally with the rear surface of the cover portion 13 as shown in FIG. 2. An air bag system 15 is mounted on the attachment wall 14. A synthetic resin casing 16 constituting this air bag system 15 is fixedly caulked to the attachment wall 14 by caulking pins 17. Foot plates 18 are provided integrally with opposite, left and right portions of the casing 16, so as to be fixedly fastened, by a bolt 20 and a nut, to a bracket 19 fixed to a not-shown automotive frame.

The casing 16 is integrally constituted by an air bag receiving casing 16a for receiving an air bag 21 and an inflator receiving casing 16b for receiving an inflator 31. The air bag 21 is attached to the upper surface of an attachment shelf plate 16c which is formed like a square ring in plan view integrally with the inner circumferential edge portion of the bottom portion of the air bag receiving casing 16a, so as to be held between the attachment shelf plate 16c and an attachment ring 22 which is formed like a square ring in the same manner. The air bag 21 is fixedly fastened by a bolt 23 and a nut 24 screwed down to the bolt 23.

A hinge portion 27 and a rupture presumptive portion 28 are formed in the cover portion 13 so as to open the cover portion 13 when the air bag 21 is inflated.

Here, a method of injection molding of the casing 16 out of resin will be described with reference to FIGS. 1 and 2.

Figure 1:
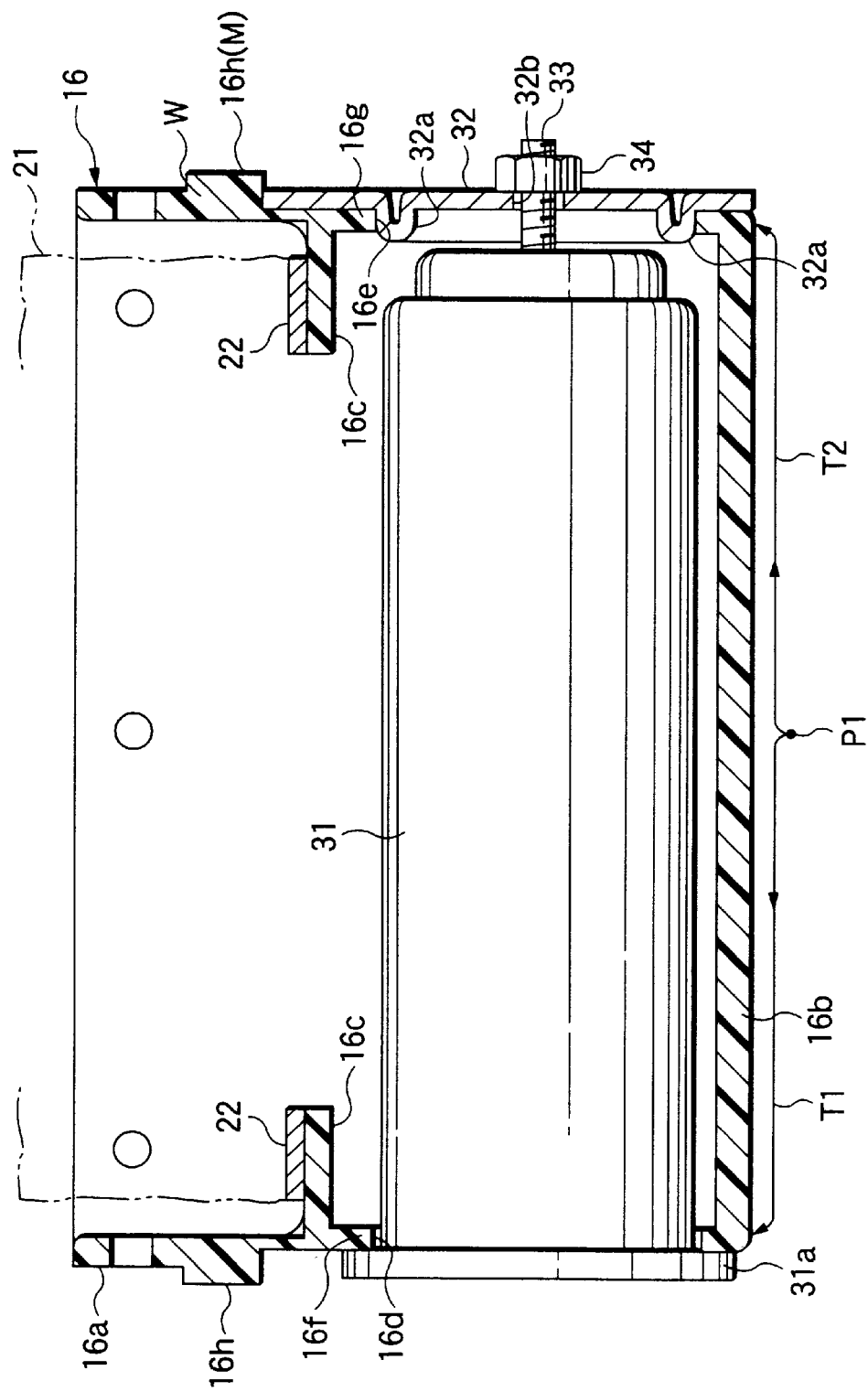
FIG. 1 shows a longitudinal sectional view of a first embodiment of an air bag system in an instrument panel according to the present invention.

As shown in FIG. 1, a gate for injecting molten resin is disposed in a lower end center portion P1 of a first cavity (not shown) for molding the inflator receiving casing 16b. Molten resin injected from this gate is charged into the first cavity toward a second cavity for molding the lock flange portions 16f and 16g, as shown by the arrows T1 and T2. Then, the molten resin flowing to a lower end position P2 of the second cavity branches arcuately in the second cavity as shown by the arrows Q1 and Q2. After flowing upward, the molten resin branches are merged with each other in an upper end position P3, and charged into a third cavity for molding the air bag receiving casing 16a and into a fourth cavity for molding the attachment shelf plate 16c. Because the molten resin branches are merged with each other in the aforementioned upper end position P3, a weld portion W is formed here.

Next, description will be made about a structure for attaching the inflator 31.

As shown in FIG. 1, the inflator 31 is formed into a sidelong column. A lock flange portion 31a is formed in a base end portion of the inflator 31 while a bolt 33 is provided at a forward end portion of the inflator 31 so as to project therefrom. Fitting holes 16d and 16e are formed in opposite end wall surfaces of the inflator receiving casing 16b so as to have the same inner diameter. The lock flange portion 16f for locking the lock flange portion 31a of the inflator 31 therein is formed in one fitting hole 16d so as to extend inward. On the other hand, the forward end portion of the inflator 31 is connected to the other fitting hole 16e through a spacer 32. That is, a fitting flange portion 32a is formed on the inner surface side of the spacer 32 so as to be bent to be fitted into the fitting hole 16e. A bolt insertion hole 32b for passing the bolt 33 of the inflator 31 therethrough to the outside is formed in the center portion of the spacer 32. By screwing a nut 34 down to the bolt 33 passed through the bolt insertion hole 32b, the lock flange portion 31a of the inflator 31 is pressed onto the lock flange portion 16f, while the inner surface of the spacer 32 is pressed onto the lock flange portion 16g provided on the outer circumferential side of the fitting hole 16e. Thus, the inflator 31 is fixedly fastened in a predetermined position inside the inflator receiving casing 16b.

Figure 3:
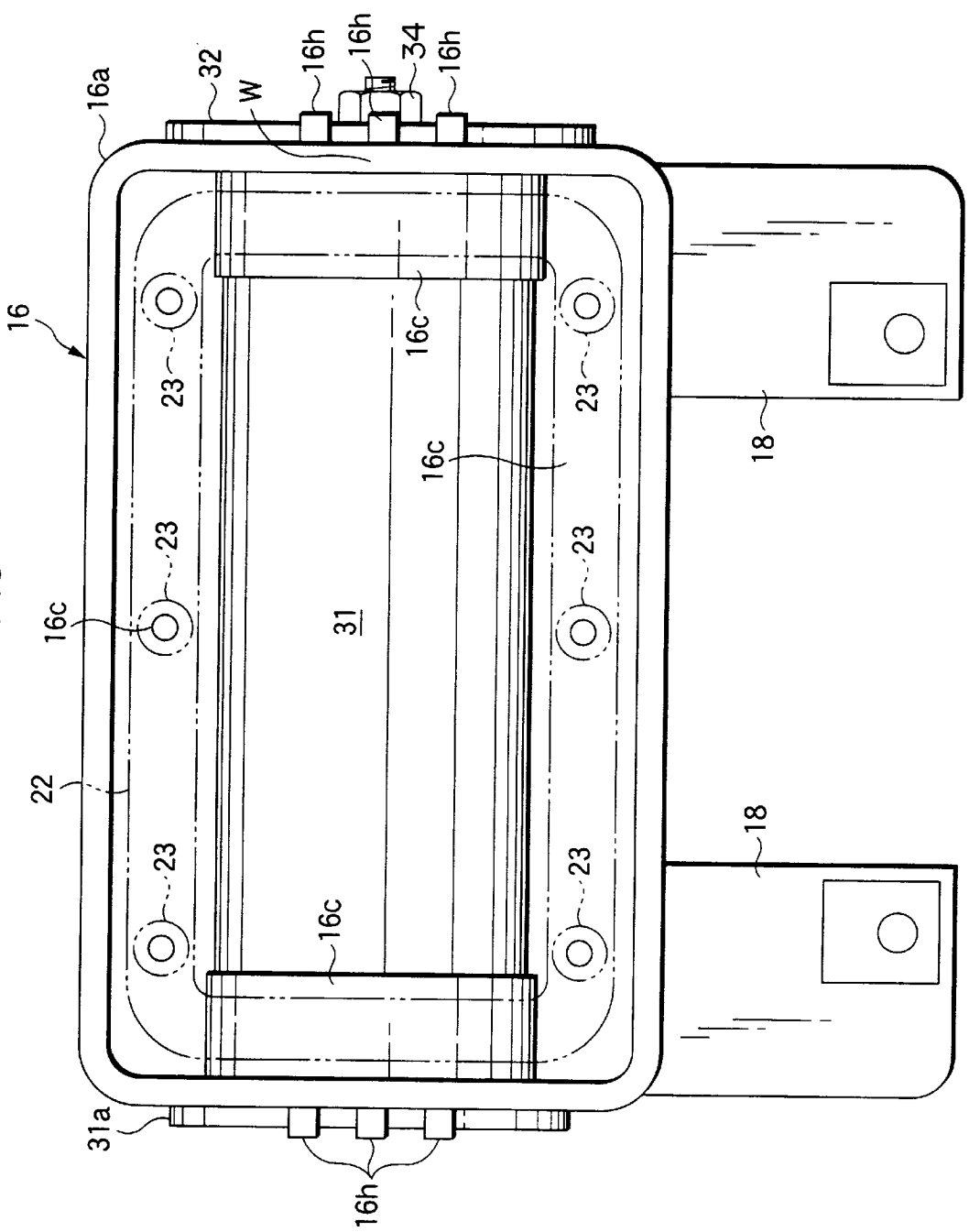
FIG. 3 shows a plan view of FIG. 1.
Figure 9:
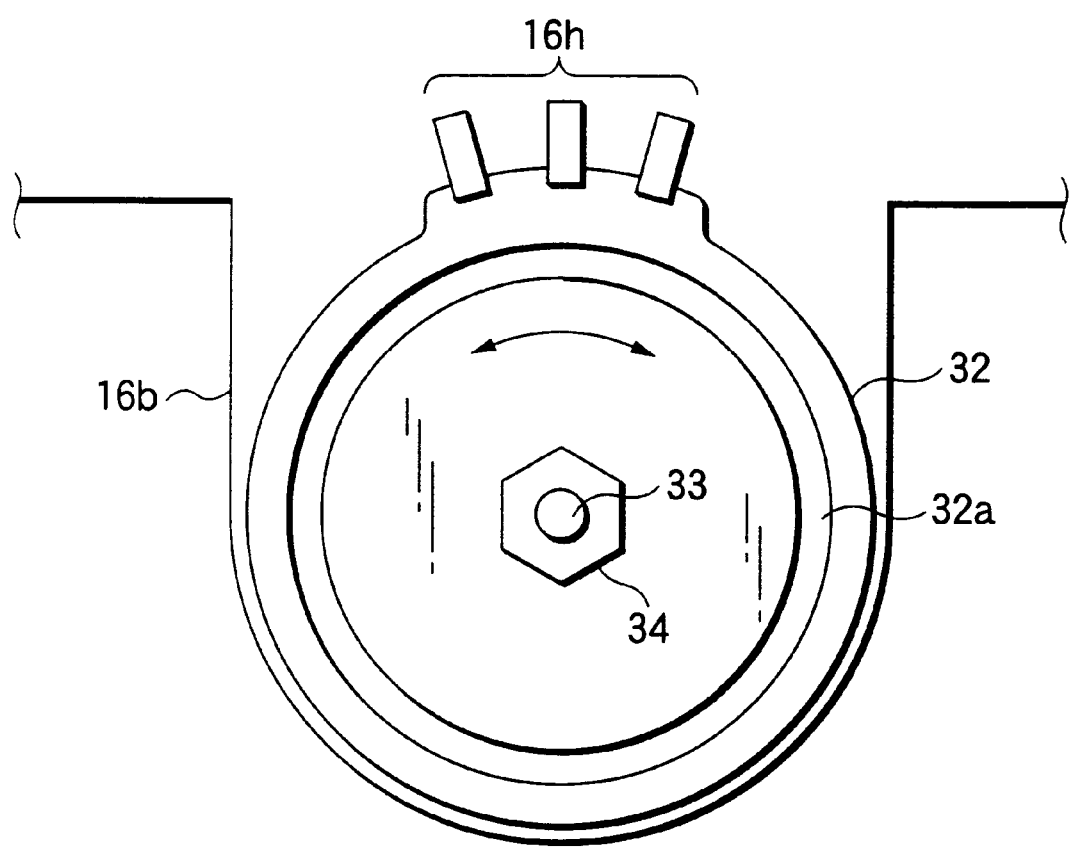
FIG. 9 shows a side view of the first embodiment of an air bag system.

As shown in FIGS. 1, 3 and 9, on the outer surface of the right end portion of the air bag receiving casing 16a, position regulating ribs 16h are provided at a plurality of places for regulating the position of the outer circumferential edge of the upper portion of the spacer 32. These position regulating ribs 16h functions as position regulating means M for preventing the inflator 31 from shifting in position. Position regulating ribs 16h similar to the aforementioned ones 16h are provided at a plurality of places also on the outer surface of the left end portion of the air bag receiving casing 16a. When the inflator 31 is attached back to front to the inflator receiving casing 16b, the position of the spacer 32 is regulated.

Next, description will be made about the operation of the air bag system configured thus.

In FIGS. 1 and 2, when a motor accident happens so that the inflator 31 is operated on the basis of a detection signal of the accident, high-pressure gas is released from the inside of the inflator 31 to the outside, and charged into the inflator receiving casing 16b. The gas is put into the air bag 21 instantaneously. The air bag 21 inflates while rupturing the rupture presumptive portion 28 in FIG. 2. Thus, the cover portion 13 is unfolded with the hinge portion 27 as a center rotation as shown by the chain line in FIG. 2, so that the air bag 21 is inflated into the cabin.

In FIG. 1, when the inflator 31 is operated, the gas is passed into a space in a bottom portion of the inflator receiving casing 16b, so that the pressure of the gas acts on the outer circumferential surface of the bottom portion of the inflator 31 so as to push it up. As a result, upward pushing force acts on the spacer 32 through the bolt 33 so as to intend the spacer 32 to shift upward in position. However, because the outer circumferential edge of the upper portion of the spacer 32 is regulated in position by the position regulating ribs 16h, there is no fear that the spacer 32 moves, and there is no fear that a gap is produced in the contact interface between the lock flange portion 16g and the spacer 32. Thus, the gas is prevented from leaking, so that the air bag 21 is inflated properly.

Further as shown in FIG. 9, the ribs 16h can prevent the spacer 32 from rotating in the direction of the arrow.

Next, the effects of the air bag system configured thus will be enumerated together with the configuration thereof.

(1) In the aforementioned embodiment, the fitting holes 16d and 16e having the same diameter are formed in the opposite end surfaces of the inflator receiving casing 16b. As a result, the inflator 31 may be inserted back to front. It is therefore possible to perform the work of assembling the inflator 31 easily.

(2) In the aforementioned embodiment, the position regulating ribs 16h for regulating the position of the outer circumferential edge of the upper portion of the spacer 32 are formed integrally with the opposite, front and rear, outer walls of the air bag receiving casing 16a. Accordingly, it is possible to prevent the spacer 32 from shifting upward in position when the inflator 31 is operated. Thus, gas leakage from the inside of the inflator receiving casing 16b can be prevented by a gap produced in the contact interface between the spacer 32 and the inflator receiving casing 16b.

(3) In the aforementioned embodiment, the position regulating ribs 16h are formed integrally with the opposite, front and rear, outer wall surfaces of the air bag receiving casing 16a. Accordingly, the position regulating ribs 16h functions as reinforcing ribs for reinforcing the weld portion W produced by the branches of molten resin which flow into each other from both the left and right directions in the third cavity when the casing 16 is molded with the resin. In addition, the attachment shelf plate 16c is formed correspondingly to the upper end position P3. Accordingly, when the molten resin flows into the fourth molding cavity for forming the attachment shelf plate 16c, the branches of synthetic resin flow into each other easily in the weld portion W so that the strength of the weld portion W is enhanced. As a result, it is possible to prevent such an accident that the weld portion W of the air bag receiving casing 16a is broken to leak the gas when the inflator is operated.

Next, other embodiments of the present invention will be described with reference to FIGS. 5 to 8. In these embodiments, the numbers the same as those in the first mentioned embodiment will be referenced correspondingly.

Figure 5:
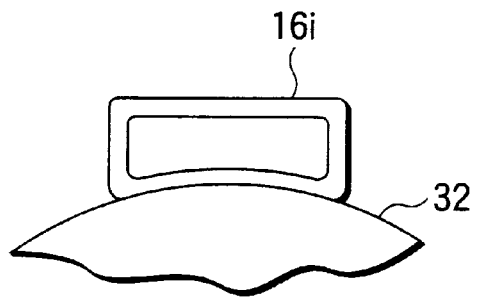
FIG. 5 shows a partially sectional view showing a second embodiment of the present invention.

In a second embodiment shown in FIG. 5, a position regulating rib 16i is formed like a closed ring on the outer wall portion of the air bag receiving casing 16a.

Figure 6:
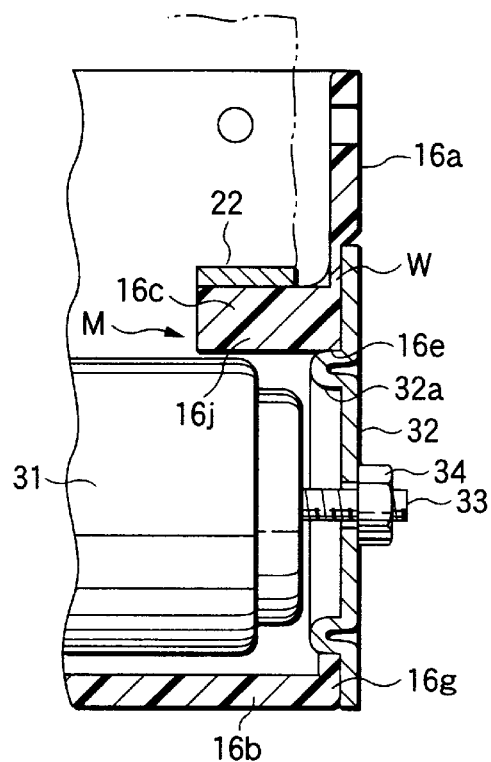
FIG. 6 shows a partially sectional view showing a third embodiment of the present invention.

In a third embodiment shown in FIG. 6, the attachment shelf plate 16c is formed to project downward, that is, toward the inflator 31. The lower surface side of the attachment shelf plate 16c is made close to the outer circumferential surface of the upper portion of the inflator 31. A position regulating rib 16j is formed integrally with the attachment shelf plate 16c, while the position regulating rib 16j also has a function as a reinforcing rib similar to the aforementioned ones. Further, the position regulating ribs 16h and 16i are omitted.

In this embodiment, when the inflator 31 is operated, the outer circumferential surface of the upper portion of the inflator 31 near its forward end abuts against the lower surface of the position regulating and reinforcing rib 16j before the fitting flange portion 32a of the spacer 32 is detached from the fitting hole 16e. Thus, it is possible to prevent the spacer 32 from shifting in position. In addition, it is possible to prevent the weld portion W from being broken.

Figure 7:
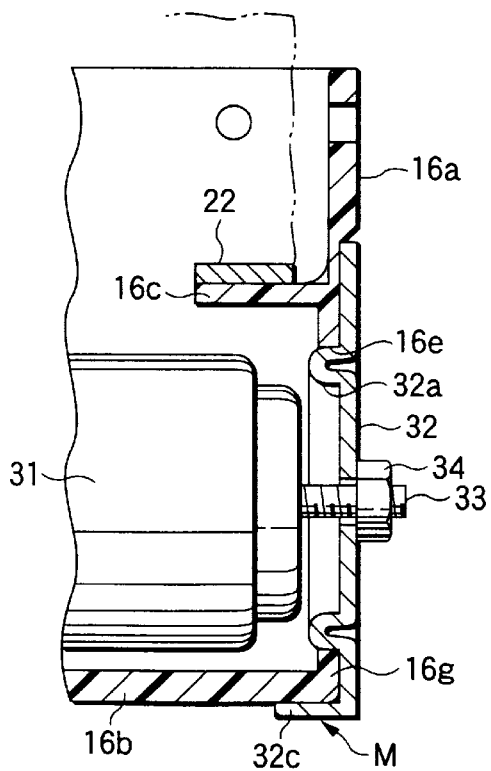
FIG. 7 shows a partially sectional view showing a fourth embodiment of the present invention.

In a fourth embodiment shown in FIG. 7, a position regulating rib 32c is formed integrally with the outer circumferential edge at the lower end of the spacer 32 so as to be locked by the abutment against the outer circumferential edge of the lower portion of the inflator receiving casing 16b.

In the embodiment shown in FIG. 7, alternatively, the position regulating rib 32c may have a function similar to that of the fitting flange portion 32a. That is, the position regulating rib 32c may be fitted widely to the outer circumferential surface of the end portion of the inflator receiving casing 16b, and the fitting flange portion 32a to be fitted into the attachment hole 16e may be omitted.

Figure 8:
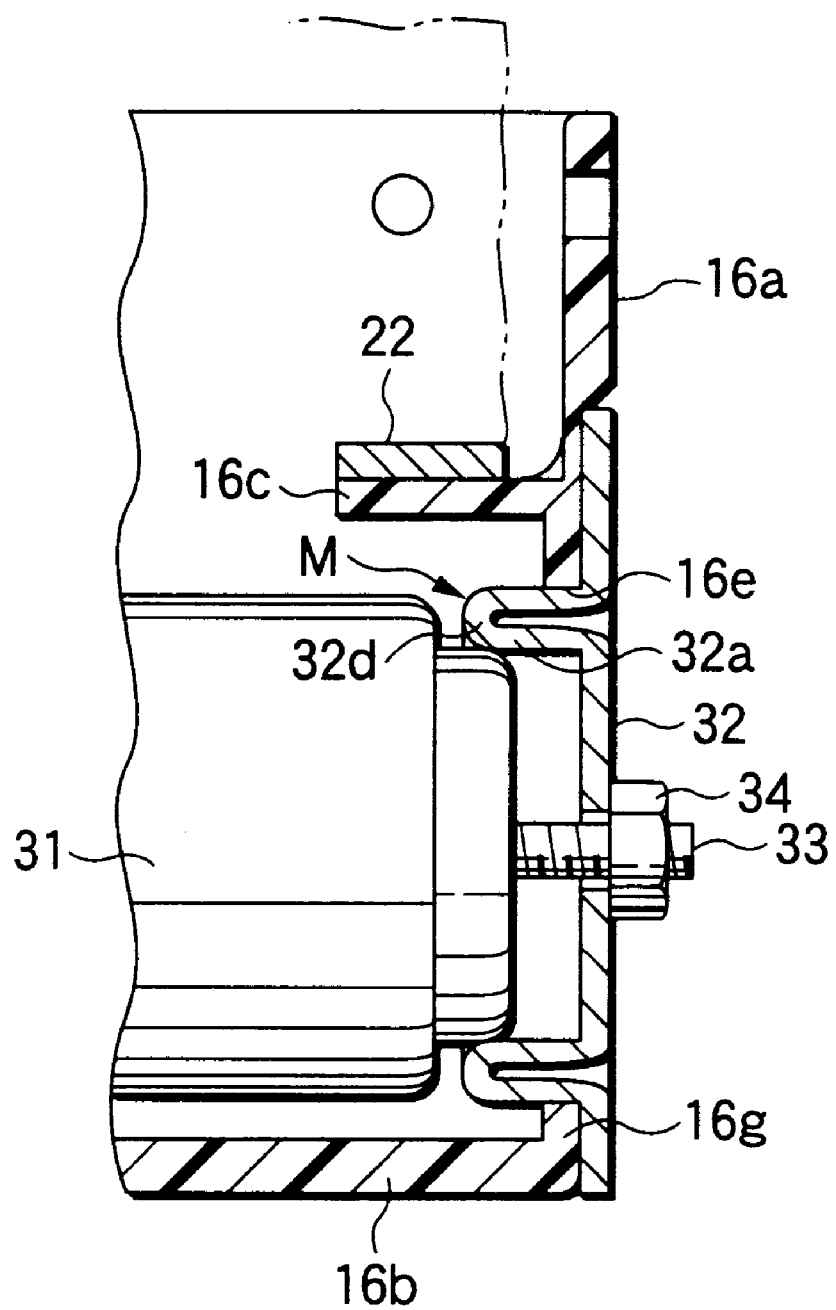
FIG. 8 shows a partially sectional view showing a fifth embodiment of the present invention.

In a fifth embodiment shown in FIG. 8, the fitting flange portion 32a of the spacer 32 is extended inward so as to form a detachment preventing ring portion 32d. Thus, the detachment preventing ring portion 32d (the fitting flange portion 32a) is designed to be prevented from being detached from the fitting hole 16e when the inflator 31 is operated.

Though not shown, in the inflator 31 in which a bolt 33 is used in place of the lock flange portion 31a, a connection structure using the aforementioned spacer 32 is adopted.

In the aforementioned embodiment, the bolt 33 and the nut 34 are used as means for connecting the inflator 31 with the spacer 32. However, they may be reversed, or replaced by a welding structure or a caulking structure.

Though not shown, there is a structure in which the spacer 32 is omitted, and the fitting hole 16e is made to have a diameter as small as that of the bolt insertion hole 32b. Although the inflator 31 itself does not shift in position in this embodiment, a reinforcing rib similar to the aforementioned reinforcing rib 16k is formed in the aforementioned weld portion W so as to prevent the weld portion W from being broken due to the gas pressure when the inflator 31 is operated.

Next, a sixth embodiment of the present invention will be described below with reference to FIGS. 10 to 14.

Figure 10:
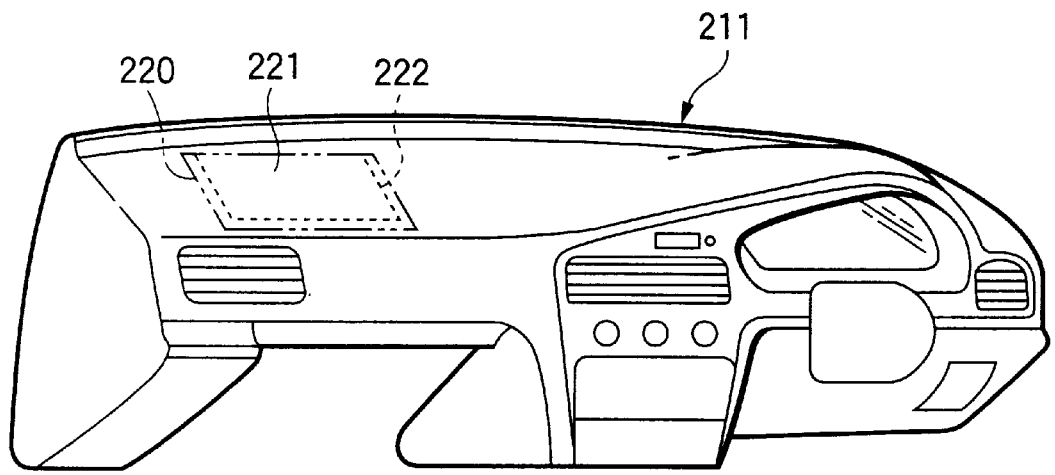
FIG. 10 shows a perspective view of the attachment state of a case of an air bag system according to an embodiment of the present invention.

As shown in FIG. 10, a case of the air bag system is attached to the rear surface on the assistant driver's seat side of an instrument panel body (hereinafter referred to as "instrument panel" simply) as a body of a vehicle interior part.

Figure 11:
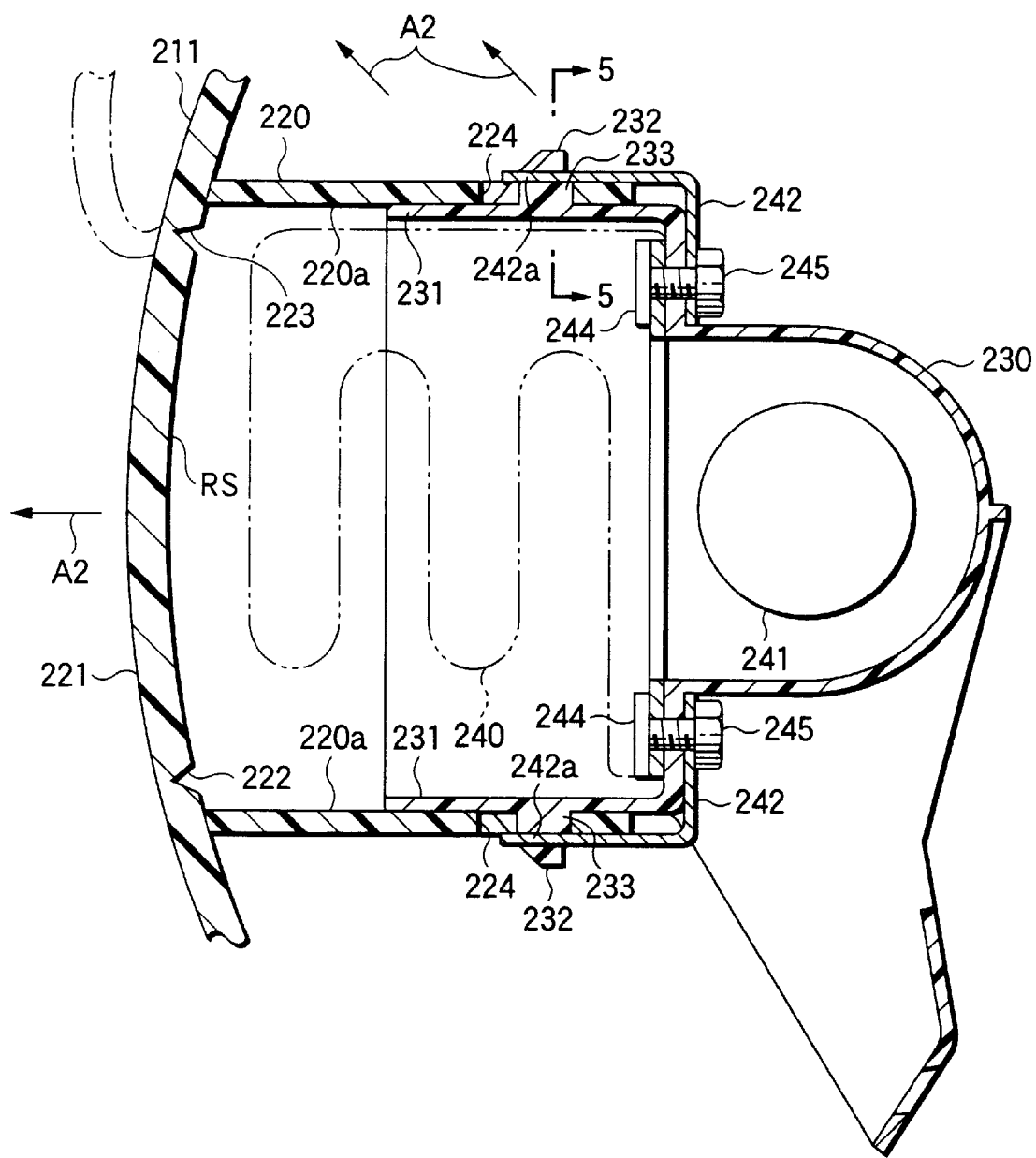
FIG. 11 shows a sectional view of the air bag system in FIG. 10.

As shown. in FIG. 11, the case of the air bag system has a cover 220 formed integrally with an instrument panel 211, a housing 230 to be fitted to the cover 220, and so on. The cover 220 and the housing 230 are, for example, made of thermoplastic resin material or the like, respectively. An air bag 240 folded up to be accommodated in the form of a bag, a cylinder-type inflator 241 for supplying gas for unfolding the air bag 240, and so on, are disposed in a space formed by the cover 220 and the housing 230.

In addition, the cover 220 has a door portion 221 which is to be opened when the air bag 240 is unfolded. The door portion 221 has a rupture presumptive recess groove portion 222 which is formed in a rear surface RS of the cover 220 so as to have a substantially U-shape in plan view (though not shown, alternatively an H-shape), and a hinge recess groove portion 223 which is formed linearly. The rupture presumptive recess groove portion 222 is formed to be deeper than the hinge recess groove portion 223. When the air bag 240 is unfolded, only the rupture presumptive recess groove portion 222 is ruptured without rupturing the hinge recess groove portion 223, so that the door portion 221 is opened.

In addition, side walls 220a like a square cylinder are formed integrally with the rear surface RS of the cover 220 so that corner portions 231 of the housing 230 are fitted to the inner surfaces of the side walls 220a.

Figure 12:
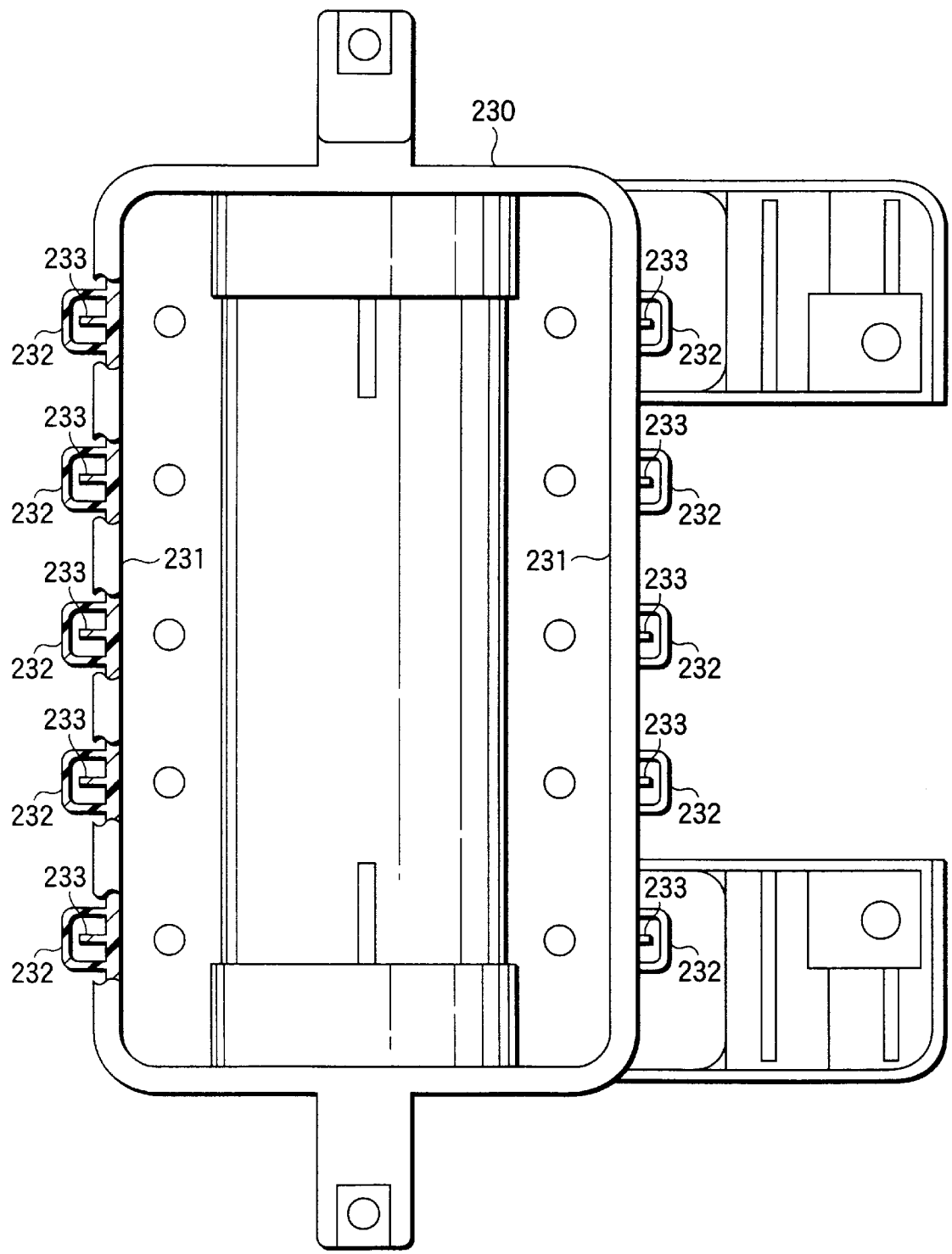
FIG. 12 shows a partially broken plan view of the case of the air bag system.

In this configuration, as shown in FIG. 12, a plurality of bridge portions 232 (210 bridge portions in this embodiment as shown in FIG. 12) as lock portions are provided on the outer surfaces of the opposite corner portions 231 of the housing 230 so as to project therefrom. Each of the bridge portions 232 is provided so that the value of the height of the inner surface thereof is larger than the thickness of the side wall 220a of the cover 220.

Figure 13:
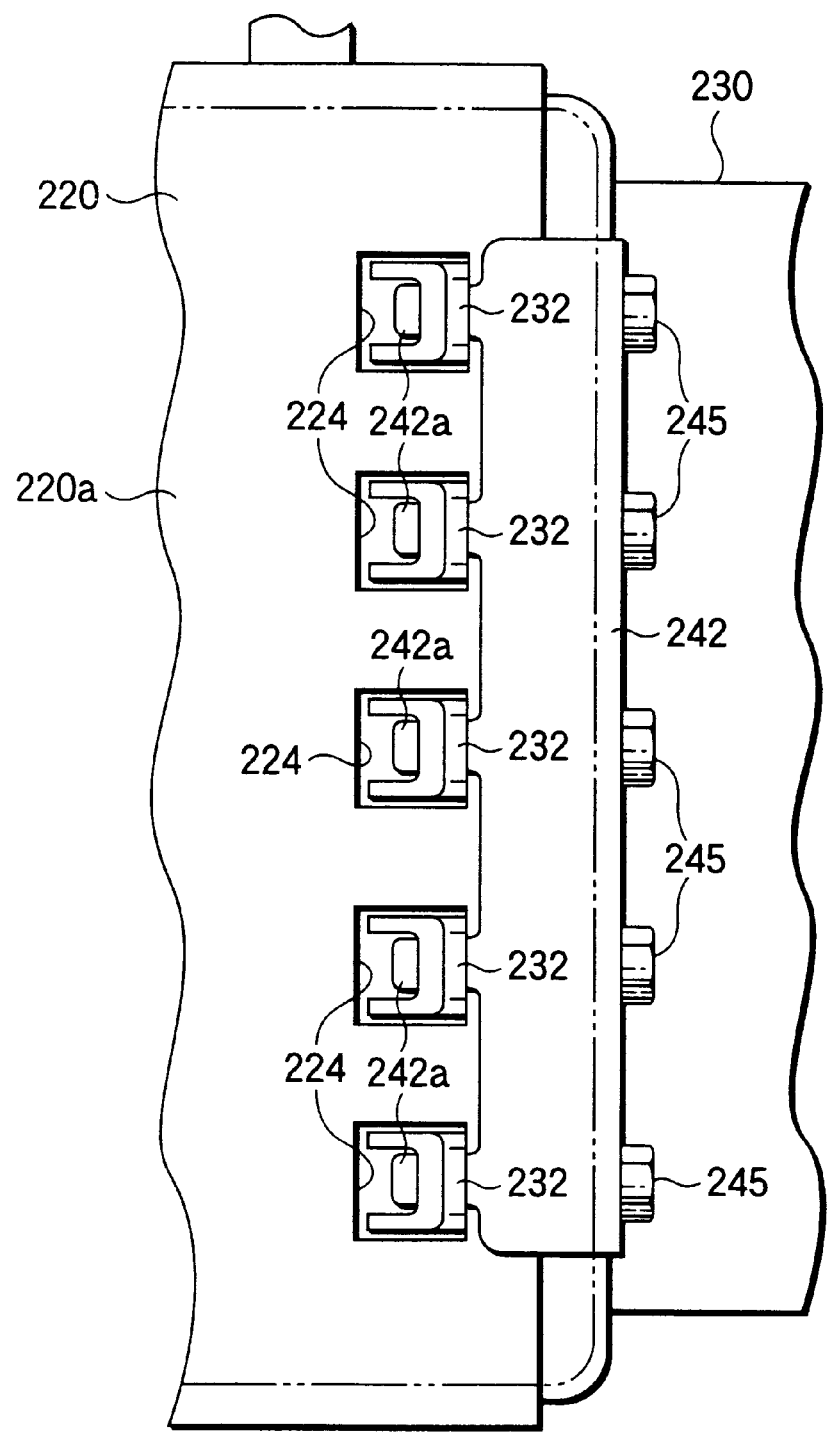
FIG. 13 shows an enlarged partially top view showing the assembling state of the case of the air bag system.

Again as shown in FIG. 13, each of the bridge portion 232 is cut obliquely on the corner portion 231 at its housing 230 side. Further, a deformation restriction rib 233 as deformation restriction means is provided inside each of the bridge portions 232 so as to project from the outer surface of the corner portion 231 of the housing 230. These deformation restriction ribs 233 are provided when the housing 230 is molded. Each of the deformation restriction ribs 233 is provided to have height which is substantially as large as the thickness of the side wall 220a of the cover 220.

In addition, in the side walls 220a of the cover 220, substantially rectangular through holes 224 as engagement portions are provided in positions corresponding to the bridge portions 232 of the housing 230. The bridge portions 232 of the housing 230 are inserted into these through holes 224 of the cover 220 so that the cover 220 is locked on the housing 230.

Figure 14:
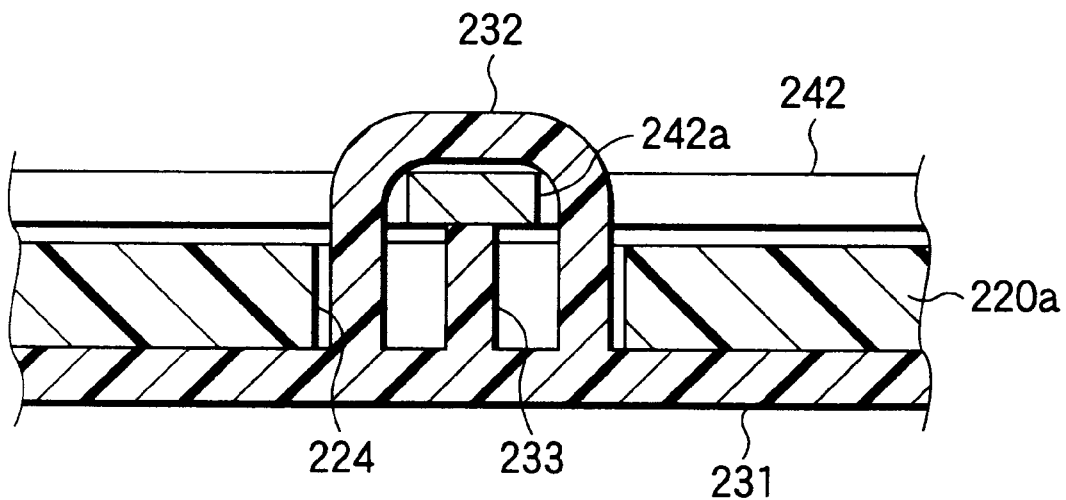
FIG. 14 shows a sectional view taken on line 5—5 in FIG. 10.
Figure 15:
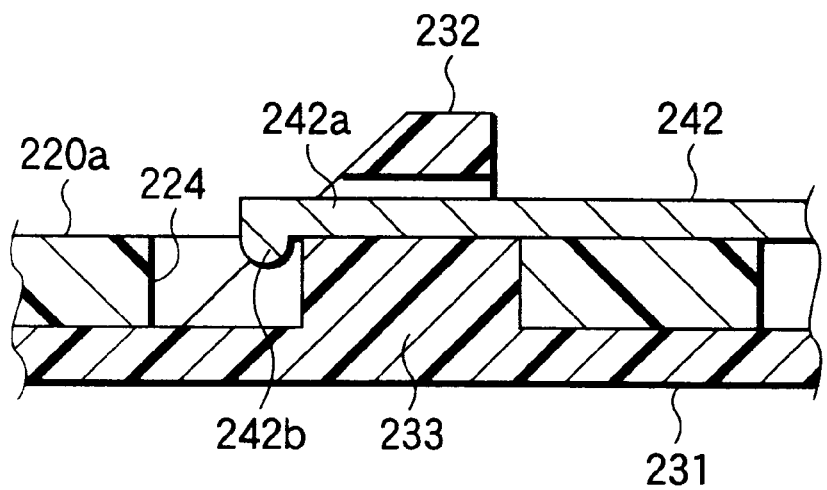
FIG. 15 shows an enlarged partially sectional view of a main portion of a case of an air bag system of a seventh embodiment.

In addition, as shown in FIGS. 14, 15 and 16, an outer doubling plate 242 as a lock holding member is used for restricting unexpected disengagement of the cover 220 from the housing 230. The outer doubling plate 242 is a sectionally L-shaped plate, which has been used in the background art. The outer doubling plate 242 is made of metal such as iron or the like, hard resin such as polypropylene (PP), ABS resin, or the like, etc. The outer doubling plate 242 has lock protrusion portions 242a at its one end. The lock protrusion portions 242a can be inserted into the bridge portions 232 of the housing 230, respectively.

Next, description will be made about the process for assembling the case of the air bag system configured thus.

First, the inflator 241, the air bag 240, and so on, are incorporated into the housing 230. Next, the housing 230 is fitted to the cover 220 so that the opening end of the housing 230 faces the opening end of the cover 220 and the side walls 220a of the cover 220 abut against the bridge portions 232 of the housing 230. Further, the housing 230 is inserted into the cover 220 toward the door portion 221. The side walls 220a of the cover 220 are moved along the cut corner portions 231 so that the through holes 224 of the cover 220 are engaged with the bridge portions 232 of the housing 230. Then, the lock protrusion portions 242a of the outer doubling plate 242 are inserted into the bridge portions 232 of the housing 230 so that the side walls 220a of the cover 220 are held between the corner portions 231 of the housing 230 and the lock protrusion portions 242a of the outer doubling plate 242, respectively. Then, the housing 230, the outer doubling plate 242, and so on, are caulked by studs 244 and nuts 245.

When the case of the air bag system is configured thus, the deformation of the lock protrusion portions 242a of the outer doubling plate 242 is restricted even if force acts on the opposite side walls 220a of the cover 220 in the direction shown by the arrows A2 in FIG. 11, that is, in the direction in which the side walls 220a of the cover 220 are made to leave the corner portions 231 of the housing 230 by the unfolding of the air bag 240. That is, because the deformation restriction ribs 233 are provided inside the bridge portions 232 of the housing 230 so as to project therefrom, the lock protrusion portions 242a of the outer doubling plate 242 abut against the deformation restriction ribs 233. Thus, the lock protrusion portions 42a are restrained from being deformed further inward. As a result, disengagement between the through holes 224 of the cover 220 and the bridge portions 232 of the housing 230 is restricted.

As has been described, according to this embodiment, it is possible to obtain the following effects.

(1) Even if the side wall 220a of the cover 220 bulges when the air bag 240 is unfolded, the deformation of the lock protrusion portions 242a of the outer doubling plate 242 can be restricted by the deformation restriction ribs 233. As a result, the lock between the through holes 224 of the cover 220 and the bridge portions 232 of the housing 230 is held so that the disengagement between the cover 220 and the housing 230 can be restricted.

(2) Because the deformation restriction ribs 233 are provided on the inner surfaces of the bridge portions 232 of the housing 230, the case of the air bag system constituted by the cover 220, the housing 230, and so on, can be restrained from increasing in size.

(3) When a plate in the background art is used as the outer doubling plate 242 in addition to the above configuration (2), disengagement between the cover 220 and the housing 230 can be restricted by a simple structure without providing any other special part.

Incidentally, the above embodiment of the present invention may be modified as follows.

Although the cover 220 was provided integrally with the instrument panel 211 in the above embodiment, the cover 220 may be formed as a body separate from the instrument panel.

Although the above embodiment was configured to provide 10 bridge portions 232 on the housing 230, the number of bridge portions 232 is optional. The number may be changed suitably in accordance with the dimensions of the cover 220 and the housing 230.

The above embodiment was configured to provide the lock protrusion portions 242a on the outer doubling plate 242 so that the lock protrusion portions 242a were inserted into all the bridge portions 232 provided on the housing 230. Alternatively, the lock protrusion portion 242a may be provided on the outer doubling plate 242 so as to be inserted into at least one of the bridge portions 232 provided on the housing 230.

The above embodiment was configured to provide the deformation restriction ribs 233 so as to project from the outer surface of the housing 230. The present invention is not however limited to this form. For example, the deformation restriction portions maybe provided to form bridges between opposite foot portions of the bridge portions 232 of the housing 230 respectively.

In the above embodiment, the deformation restriction ribs 233 were provided integrally with the housing 230. Alternatively, the deformation restriction ribs 233 may be provided in the bridge portions 232 separately from the housing 230.

The above embodiment is configured such that the outer doubling plate 242 had the lock protrusion portions 242a. Engagement protrusion portions 242b to be engaged with the deformation restriction ribs 233 may be further provided at the forward end portions of the lock protrusion portions 242a as shown in a seventh embodiment in FIG. 15.

In such a case, in addition to the effects (1) to (3) according to the above embodiment, it is possible to obtain an effect that disengagement between the cover 220 and the housing 230 can be restricted more effectively because the engagement protrusion portions 242b of the outer doubling plate 242 are engaged with the deformation restriction ribs 233.

The deformation restriction ribs 233 were provided integrally with the housing 230 in the above embodiment. Alternatively, however, such deformation restriction means may be provided to constitute part of the cover 220 as shown in an eighth embodiment in FIGS. 16A and 16B.

Figure 16A:
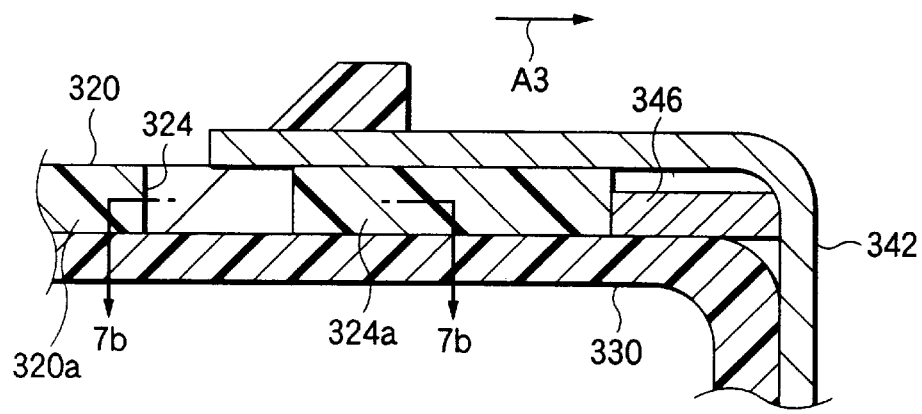
FIG. 16A shows an enlarged partially sectional view of a main portion of a case of an air bag system of an eighth embodiment.
Figure 16B:
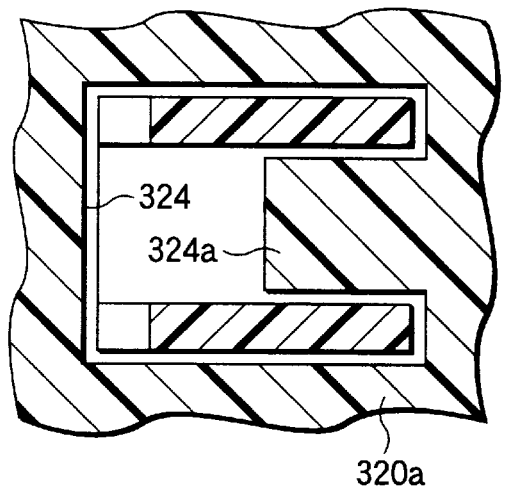
FIG. 16B shows a sectional view taken on line 7b—7b in FIG. 16A.

That is, as shown in FIGS. 16A and 16B, a deformation restriction protrusion portion 324a acting as deformation restriction means may be provided so as to project from one side of a through hole 324 provided in a side wall 320a of a cover 320. Further, a movement restriction portion 346 may be provided to prevent the cover 320 from moving in the direction shown by the arrow A3 in FIG. 16A. The movement restriction portion 346 may be formed integrally with an outer doubling plate 342, a housing 330, the cover 320, or the like, or may be disposed separately from these members.

In the above embodiment, the outer doubling plate 342 was used. The present invention is not however limited to this form. For example, such a clip-like lock holding member as shown in FIG. 17, or the like, may be used.

Figure 17:
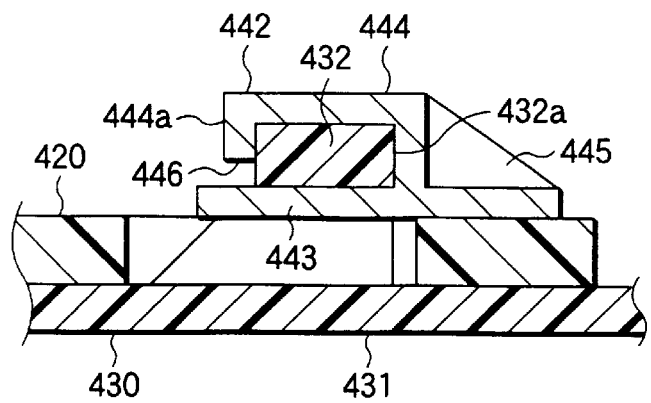
FIG. 17 shows an enlarged partially sectional view of a main portion of a case of an air bag system of a ninth embodiment.
Figure 18:
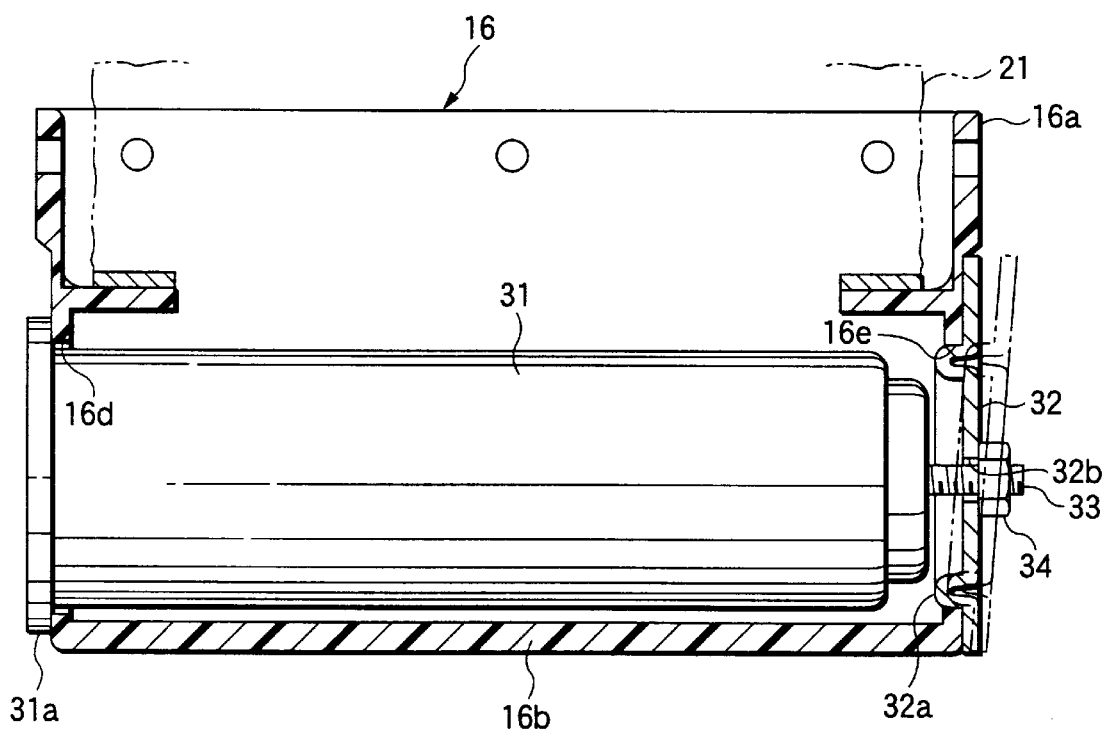
FIG. 18 shows a longitudinal sectional view of a background-art air bag system.
Figure 19:
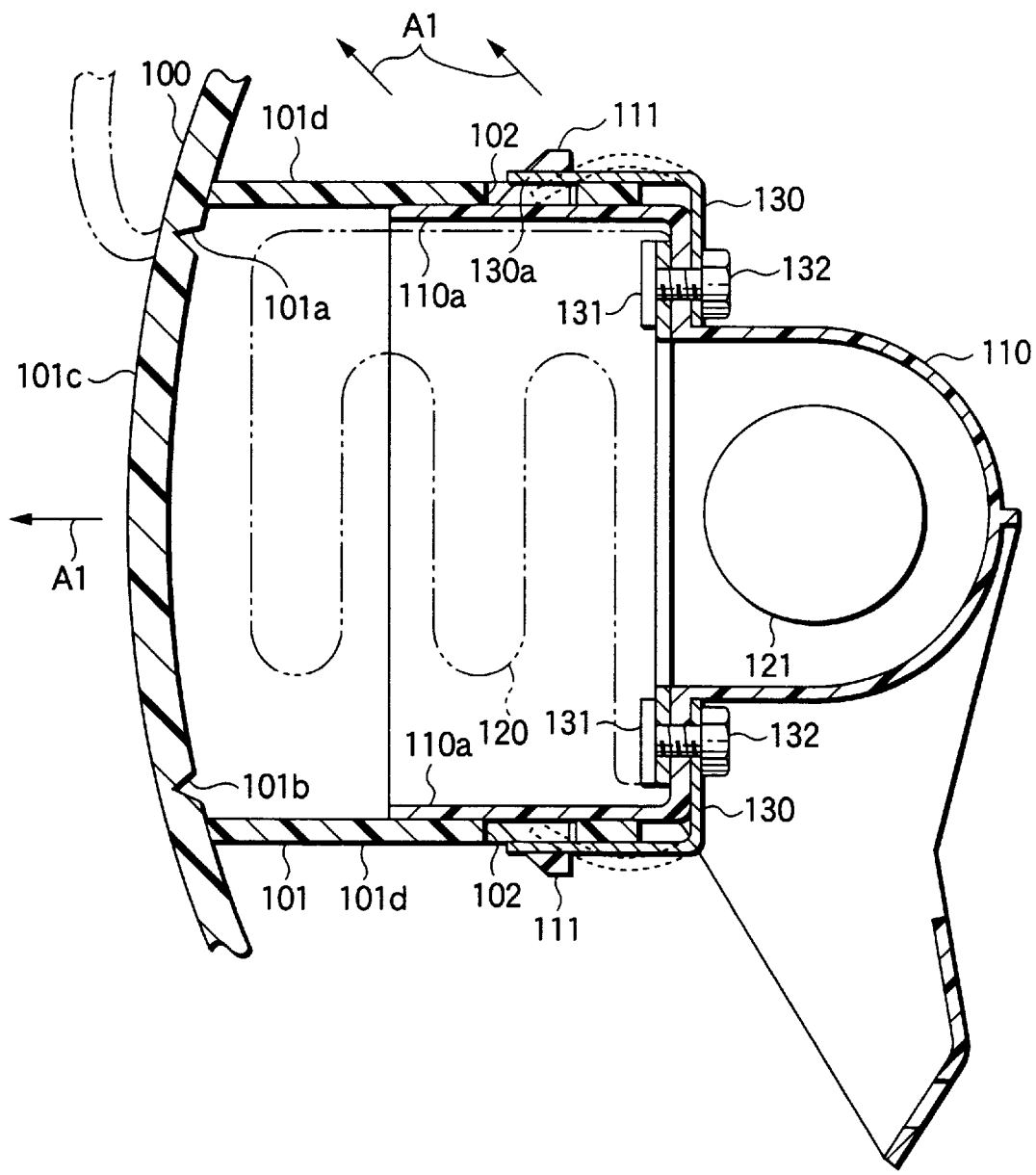
FIG. 19 shows a sectional view of a background-art case of an air bag system.

As shown a ninth embodiment in FIG. 17, a clip 442 acting as the lock holding member has a substantially h-shape in section, and includes a lock holding portion 443, a lock claw portion 444, and a deformation restriction rib 445 acting as deformation restriction means. The lock holding portion 443 is provided to be able to be inserted into a bridge portion 432 provided in a corner portion 431 of a housing 430. The lock claw portion 444 is provided at its opening portion 446 with a detachment preventing protrusion portion 444a. The deformation restriction rib 445 is provided to abut against one side wall of the clip 442 and part of the lock holding portion 443. Deformation of the clip 442 and disengagement between the cover 420 and the housing 430 are restricted by the deformation restriction rib 445.

Next, brief description will be made about the assembling of the case of the air bag system configured thus.

In the same manner as in the above embodiment, the cover 420 is locked on the housing 430. Then, the lock holding portion 443 of the clip 442 is inserted into the bridge portion 432 of the housing 430 from one side surface 432a, while the lock claw portion 444 is locked on the other side surface of the bridge portion 432.

In such a case, it is possible to obtain effects similar to the effects (1) and (2).

Although description was made about an instrument panel in the aforementioned embodiments, the present invention is applicable to an automotive interior parts other than the instrument panel, such as a door trim, a seat bag, or the like, which is disposed to cover an air bag of an air bag system.

As has been described, according to the invention, gas is prevented from leaking from a casing receiving an inflator and a casing receiving an air bag, so that the air bag can be inflated surely.

The structure of position regulating means can be formed easily by position regulating ribs which are formed integrally with the outer surface or the inner surface of the air bag receiving casing.

Position regulating means can be constituted only by forming a position regulating rib on the outer circumferential edge surface of a spacer. Therefore, the spacer can be formed easily by press molding.

A position regulating rib is also used as an attachment shelf plate for connecting the air bag with the inner circumferential edge of the bottom portion of the air bag receiving casing. It is therefore possible to make the structure simple.

The casing can be prevented from being broken, so that it is possible to prevent gas from leaking to the outside when the inflator is operated.

A reinforcing rib can prevent the casing from being broken from a weld portion, so that it is possible to prevent gas from leaking to the outside when the inflator is operated.

Further according to the invention, the lock between the engagement portion of the cover and the lock portion of the housing is held so that it is possible to restrict disengagement between the cover and the housing even when the air bag is unfolded.

In addition, deformation of the lock holding portion of the lock holding member can be restricted when the air bag is unfolded.

The size of the case of the air bag system can be restricted so as not to increase.

Further, disengagement between the engagement portion of the cover and the lock portion of the housing can be restricted without providing any other special part.

Further, disengagement between the engagement portion of the cover and the lock portion of the housing can be restricted more effectively.

This invention is not limited to the above description of the mode for carrying out the invention and embodiments thereof at all, and includes various modifications that can be conceived by those skilled in the art without departing from the scope of the claims.

What is claimed is:

1. An air bag system, comprising:
   an air bag;
   an inflator for generating gas for inflating said air bag, said inflator having a first end and a second end with a flange portion;
   a casing for receiving said air bag and said inflator, said casing comprising an air bag receiving casing and an inflator receiving casing each being made of synthetic resin; and
   a cover portion for covering an opening portion of said casing, wherein first and second fitting holes are formed in two wall surfaces of said inflator receiving casing opposite to each other and said first and second fitting holes are substantially equal in diameter to each other and said inflator can be fitted into said fitting holes, wherein the first end of said inflator is engaged with the first fitting hole through a spacer and the second end of said inflator is connected to the second fitting hole through said flange portion, and a position regulating member is provided on one of said casing and said spacer for preventing said spacer from shifting in position, wherein said position regulating member includes a position regulating rib formed on an outer circumferential edge of said spacer bent to cover an outer circumferential surface of said inflator receiving casing.

2. An air bag system, comprising:

an air bag;

an inflator for generating gas for inflating said air bag, said inflator having a first end and a second end with a flange portion;

a casing for receiving said air bag and said inflator, said casing comprising an air bag receiving casing and an inflator receiving casing each being made of synthetic resin; and a cover portion for covering an opening portion of said casing, wherein first and second fitting holes are formed in two wall surfaces of said inflator receiving casing opposite to each other and said first and second fitting holes are substantially equal in diameter to each other and said inflator can be fitted into said fitting holes, wherein the first end of said inflator is engaged with the first fitting hole through a spacer and the second end of said inflator is connected to the second fitting hole through said flange portion, and a position regulating member is provided on one of said casing and said spacer for preventing said spacer from shifting in position, wherein said position regulating member includes a position regulating rib integrally formed with an inner surface of a boundary portion of the casing between said air bag receiving casing and said inflator receiving casing projecting from an inner surface of the boundary portion and imposing a positional regulation on an outer circumferential surface of said inflator, wherein said position regulating rib is integrally formed with an attachment shelf plate that connects said air bag with an inner circumferential edge of a bottom portion of said air bag receiving casing.

* * * * *